(12) United States Patent
Fredette et al.

(10) Patent No.: US 11,720,164 B1
(45) Date of Patent: Aug. 8, 2023

(54) ACHIEVING POWER SAVINGS AND LOW LATENCY FOR STORAGE

(71) Applicant: Dell Products L.P., Hopkinton, MA (US)

(72) Inventors: Matthew Fredette, Belmont, MA (US); James Guyer, Northboro, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/725,651

(22) Filed: Apr. 21, 2022

(51) Int. Cl.
*G06F 1/32* (2019.01)
*G06F 1/3287* (2019.01)

(52) U.S. Cl.
CPC .................................. *G06F 1/3287* (2013.01)

(58) Field of Classification Search
CPC ..................................................... G06F 1/3287
See application file for complete search history.

(56) References Cited

U.S. PATENT DOCUMENTS

| | | | |
|---|---|---|---|
| 2010/0037038 A1* | 2/2010 | Bieswanger | G06F 9/5094 713/300 |
| 2019/0042331 A1* | 2/2019 | Mcdonnell | G06F 1/3206 |

* cited by examiner

*Primary Examiner* — Stefan Stoynov
(74) *Attorney, Agent, or Firm* — Anderson Gorecki LLP

(57) ABSTRACT

A data storage system with multi-core processors dynamically enables and disables processor cores in order to manage power consumption while maintaining performance. One or more active processor cores are disabled responsive to determining that the current workload can be serviced with fewer active processor cores than are currently enabled while maintaining performance. One or more inactive processor cores are enabled responsive to determining that the current workload cannot be serviced with the currently active processor cores while maintaining performance. Separate utilization thresholds may be implemented for enabling inactive processor cores and disabling active processor cores to promote stability.

20 Claims, 4 Drawing Sheets

US 11,720,164 B1

ACHIEVING POWER SAVINGS AND LOW LATENCY FOR STORAGE

TECHNICAL FIELD

The subject matter of this disclosure is generally related to data storage systems.

BACKGROUND

High-capacity data storage systems such as storage area networks (SANs), network-attached storage (NAS), and storage arrays are used to maintain large storage objects that may be contemporaneously accessed by multiple host servers. Such storage systems include compute nodes that manage access to data maintained on arrays of non-volatile drives. The compute nodes respond to input-output (IO) commands from host applications that run on the host servers. Examples of host applications may include, but are not limited to, software for email, accounting, manufacturing, inventory control, and a wide variety of other business processes. Storage system performance is typically expressed in terms of the average number of IO commands per second (IOPS) that can be serviced with no greater than a predetermined latency, which is the time between receiving an IO command and either returning data in the case of a read or returning an acknowledgment in the case of a write. A wide variety of factors influence performance and IO processing latency.

SUMMARY

The presently disclosed invention is predicated in part on recognition that power consumption by a storage system is relatively stable over a range of IO workloads because lightly utilized processor cores consume nearly as much power as fully utilized processor cores. Consequently, the number of active processor cores can be dynamically adjusted based on varying IO workloads to reduce power consumption while maintaining acceptable IO latency. For example, cores that are not needed to service a current workload without exceeding a predetermined IO latency may be quiesced.

In accordance with some implementations, a method comprises: in a data storage system comprising at least one compute node with a multi-core processor and non-volatile drives, determining whether a current workload can be serviced with fewer active processor cores than are currently enabled while maintaining a predetermined performance characteristic; and disabling at least one of the active processor cores responsive to determining that the current workload can be serviced with fewer active processor cores than are currently enabled while maintaining the predetermined performance characteristic.

In accordance with some implementations, an apparatus comprises: a plurality of non-volatile drives; at least one compute node with a multi-core processor that runs threads that access the non-volatile drives; and a controller configured to determine whether a current workload can be serviced with fewer active processor cores than are currently enabled while maintaining a predetermined performance characteristic and disable at least one of the active processor cores responsive to determining that the current workload can be serviced with fewer active processor cores than are currently enabled while maintaining the predetermined performance characteristic.

In accordance with some implementations, a non-transitory computer-readable storage medium stores instructions that when executed by a compute node of a data storage system perform a method comprising: determining whether a current workload can be serviced with fewer active processor cores than are currently enabled while maintaining a predetermined performance characteristic; and disabling at least one of the active processor cores responsive to determining that the current workload can be serviced with fewer active processor cores than are currently enabled while maintaining the predetermined performance characteristic.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media or differentiate between hard disk drives (HDDs) and solid-state drives (SSDs). The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
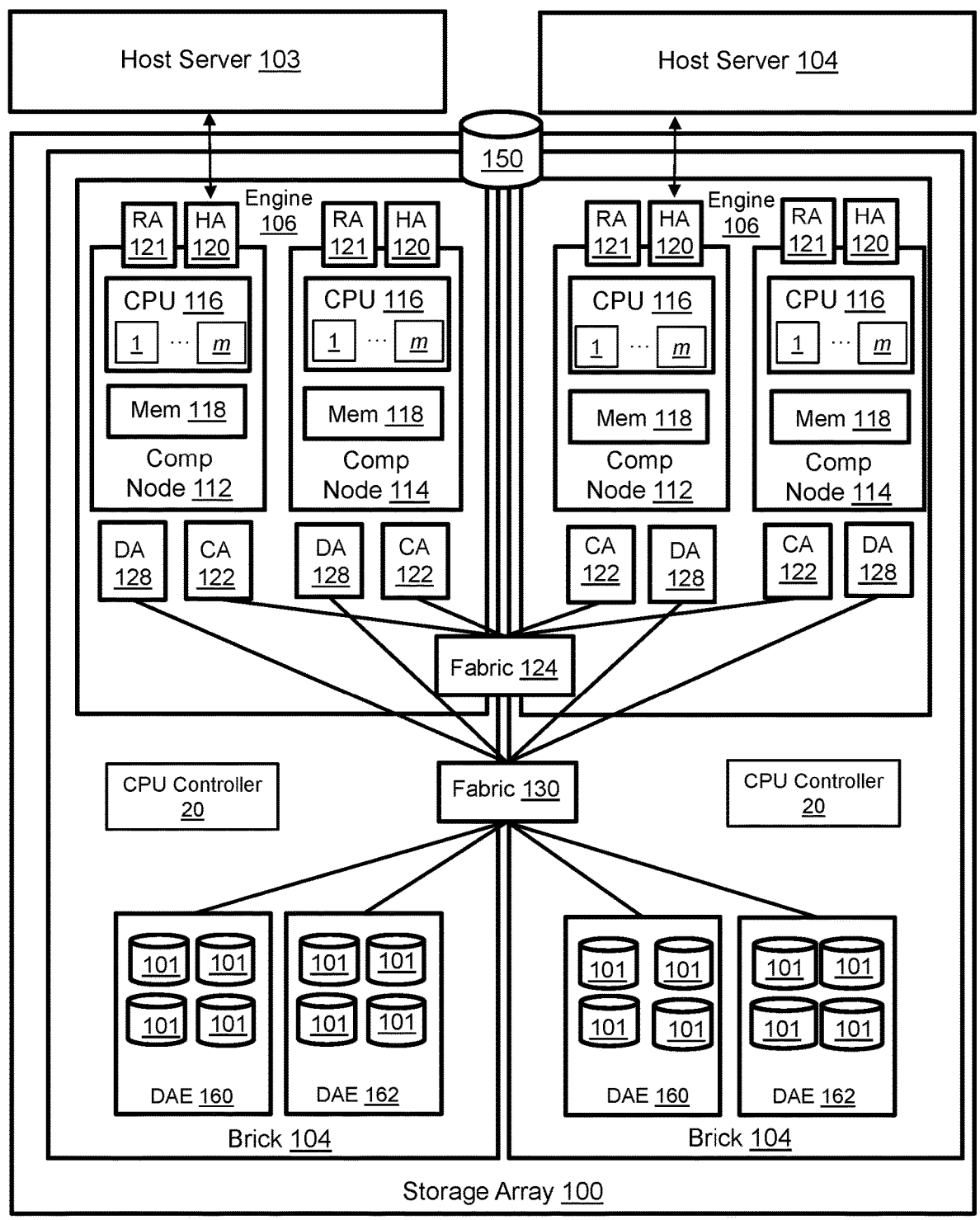
FIG. 1 illustrates a storage array with CPU controllers that enable and disable processor cores to achieve power savings while maintaining acceptable IO latency.

FIG. 1 illustrates a storage array 100 with CPU controllers 20 that are configured to dynamically enable and disable processor cores to achieve power savings while maintaining acceptable IO latency in the presence of variable IO loading. As will be explained below, a suitable number of processor cores to achieve acceptable IO latency for a given workload are made active and additional processor cores are halted and placed in a low power state. If the workload increases relative to a first threshold, some of the halted processors are activated. If the workload decreases relative to a second threshold, some of the active processors are disabled.

The storage array 100 is depicted in a simplified data center environment with two host servers 103, 104 that run host applications. However, the cluster would typically include more than two host servers. The host servers 103, 104 may include volatile memory, non-volatile storage, and one or more tangible processors that support instances of a host application, as is known in the art. The storage array 100 includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts 103, 104 from the compute nodes 112, 114. Nevertheless, the host applications could run on the compute nodes, e.g., on virtual machines or in containers. Each compute node is implemented as a separate printed circuit board (PCB) or blade that includes hardware resources such as local memory 118 and one or more multi-core central processing units (CPUs) 116. The CPUs could include GPU cores. The local memory 118 may include volatile media such as dynamic random-access memory (DRAM), non-volatile memory (NVM) such as storage class memory (SCM), or both. Each compute node allocates a portion of its local memory to a shared memory that can be accessed by all other compute nodes of the storage array using direct memory access (DMA). Each compute node includes one or more host adapters (HAs) 120 for communicating with the host servers 103, 104. Each host adapter has resources for servicing IOs from the host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets for replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Each CPU 116 includes multiple cores 1 through m. The CPU cores may include include GPU cores. The cores are capable of self-disabling and are also capable of disabling and enabling other cores. When disabled (halted), a CPU core enters a low power state. Core caches are flushable and capable of entering a low power state. When halted and in a low power state, neither the core nor its caches need to store state information. Cores can be quickly restarted (enabled) from the low power state, e.g., in under 10 µsec. The state of any thread and of any IO is represented in memory such that cores that have been halted can be restarted on any thread or restarted to look for threads to run.

The managed drives 101 are not discoverable by the host servers 103, 104 but an associated storage object 150 is discoverable by the host servers. Without limitation, storage objects may be referred to as volumes, devices, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers 103, 104, each production storage object is a single disk having a set of contiguous logical block addresses (LBAs) on which data used by the instances of a host application resides. However, the host application data is stored at non-contiguous addresses on various managed drives 101.

The compute nodes 112, 114 maintain metadata that maps between the LBAs of the production storage object and physical addresses on the managed drives 101 in order to process IOs from the host servers 103, 104. In response to receipt of an 10 from a host server, a compute node determines whether the designated LBAs are present in the shared memory. If the LBAs are present in the portion of the shared memory that is local to the compute node that received the IO (i.e., on the same PCB), then the compute node uses the data in the local portion of shared memory to process the IO. More specifically, data copied from the local portion of the shared memory is sent to the host in the case of a read, whereas data is written to the local portion of shared memory in the case of a write. If the LBAs are not present in the local portion of shared memory but are present in a non-local portion of the shared memory, then the compute node uses a DMA operation to obtain the data from the non-local shared memory in the case of a read, whereas the compute node uses a DMA operation to write the data to non-local shared memory in the case of a write. If the LBAs are not present in the shared memory, a situation known as a "cache miss," then the compute node accesses the managed drives to copy the data into shared memory in the case of a read or destage data in the case of a write. These and other functions that contribute to IO processing latency are performed by different, specialized types of threads running on the CPUs. Each thread is a sequence of instructions that is executed by a CPU core when dictated by the thread scheduler. The productivity of threads varies based on factors including the IO workload.

Figure 2:
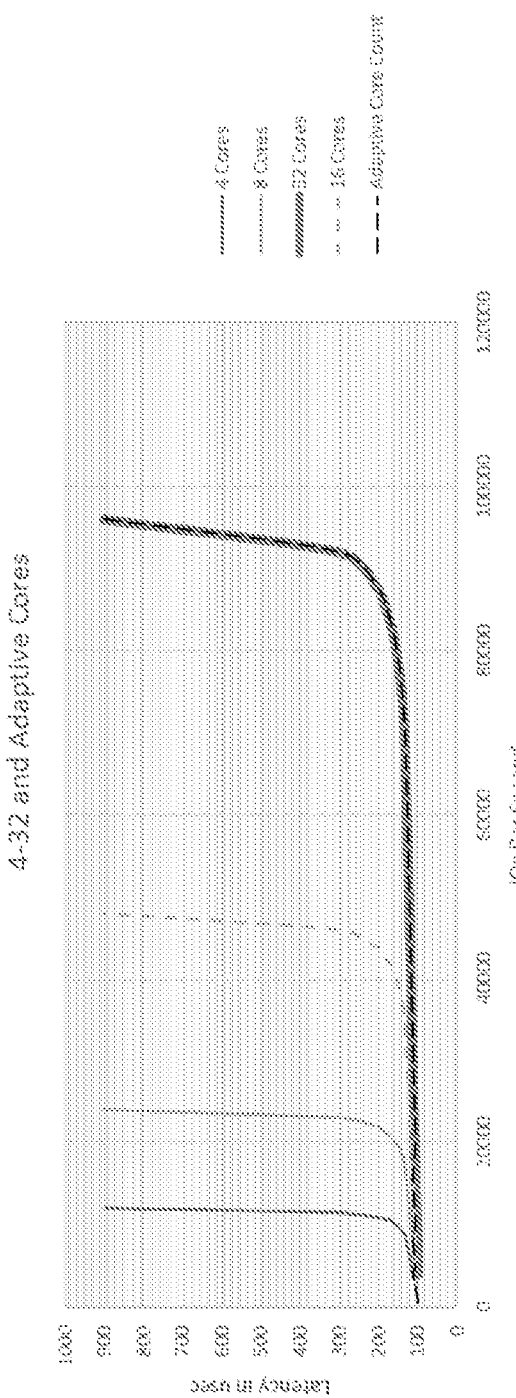
FIG. 2 is a graph of performance for different numbers of active processor cores under different workloads

FIG. 2 is a graph of storage system performance for different numbers of active processor cores under different workloads. Specifically, respective performance in terms of IO latency when running 4, 8, 16, and 32 active cores is plotted for a range of 0-100000 IOPS. IO latency measurement differs between reads and writes. In the case of a read, IO latency is the time between when the storage array receives the IO and when the storage array sends the corresponding data to the host initiator. In the case of a write, IO latency is the time between when the storage array receives the IO and when the storage array sends a write acknowledgment to the host initiator. The write acknowledgement may be sent before the data is destaged from the shared memory to the managed drives. The illustrated workload represents a mix of reads and writes. As indicated by the graph, IO latency yielded by 4, 8, 16, or 32 active cores is relatively similar and stable up to core number utilization limits at which IO latency increases rapidly. That limit differs based on how many cores are active. For example, there is no significant performance improvement yielded by having 32 active cores working on a 20000 IOPS workload rather than 16 active cores, but at 60000 IOPS 32 active cores maintains relative stability in latency while 16 active cores yield significantly increased latency. The ranges of performance overlap can be used to determine how many cores to enable/disable.

Figure 3:
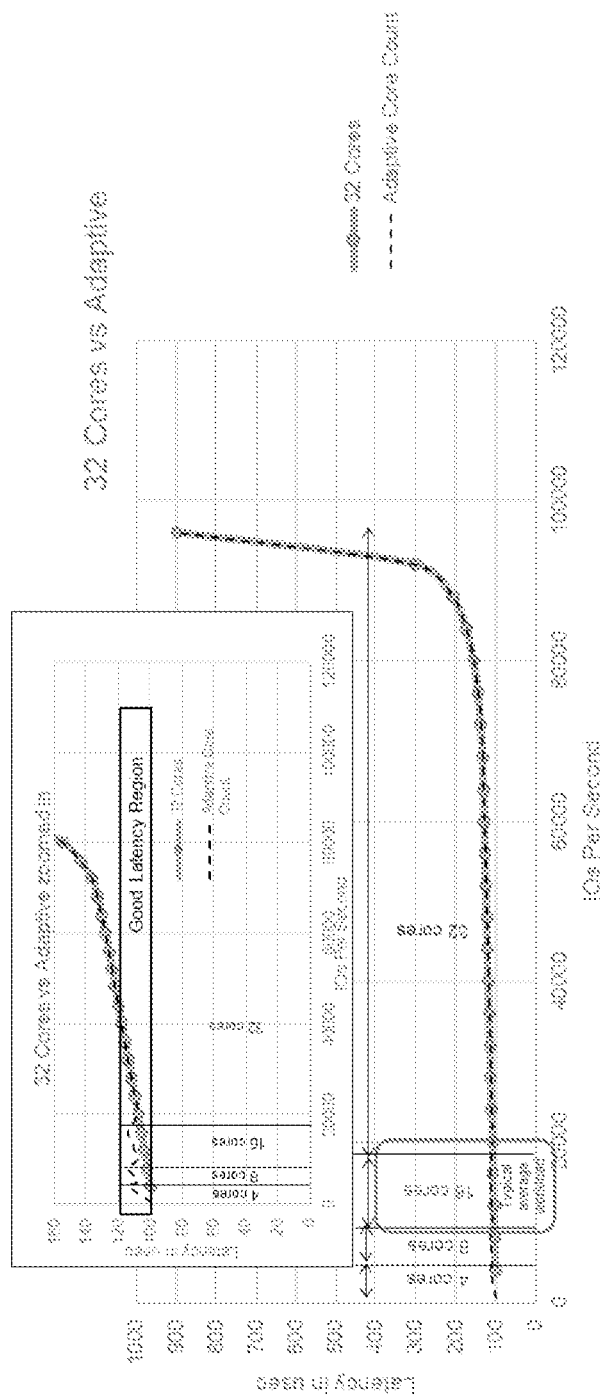
FIG. 3 illustrates adaptive processor core enablement/disablement.

FIG. 3 illustrates adaptive processor core enablement/disablement. A region of acceptably good latency is defined by a maximum acceptable value of IO latency, e.g., 120 μSec. Performance within the good latency region is achievable up to 20000 IOPS with adaptive active core counts of 4, 8, and 16 cores at increasing IOPS thresholds, as indicated by inflexions in the graph. Thus, a typical workload of 10000-20000 IOPS may be adequately serviced by only 16 active cores. Disabling 16 of 32 total cores will yield power consumption savings while maintaining acceptable IO latency. Cores can be disabled or enabled for workloads that are less than or greater than the typical workload while maintaining acceptable IO latency. The increments of 4, 8, 16, and 32 cores are merely examples and should not be viewed as limitations. It will be understood by those of ordinary skill in the art that the described and illustrated good latency characteristics are merely examples and should not be viewed as limitations. A wide variety of good latency characteristics could be specified.

Figure 4:
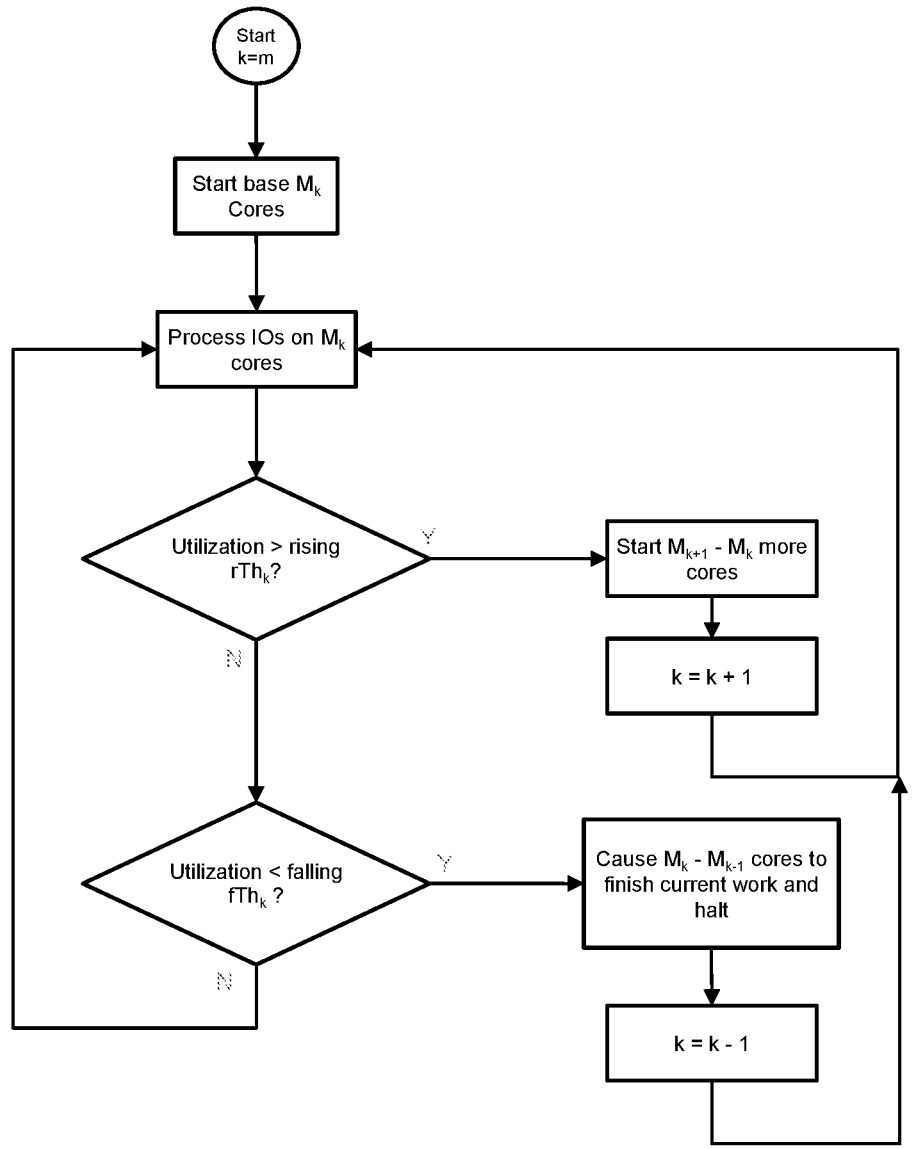
FIG. 4 illustrates a method for enabling and disabling processor cores to achieve power savings while maintaining acceptable IO latency.

FIG. 4 illustrates a method for enabling and disabling processor cores to achieve power savings while maintaining acceptable IO latency. Starting with an integer variable k set to m so there are $M_m=M_k$ active cores, IOs are processed on the $M_k$ cores. $M_0, \ldots, M_m, \ldots, M_{i-1}$ is a vector of increasing numbers of cores to run for successive workload ranges, where there are i total workload ranges. Continuing with the example above, a first workload range may be associated with 4 active cores, a second workload range may be associated with 8 active cores, a third workload range may be associated with 16 active cores, and a fourth workload range may be associated with 32 active cores. If utilization is greater than a rising utilization threshold $rTh_k$, then additional cores are enabled, where $rTh_{-j}, \ldots,$ $rTh_0, \ldots, rTh_i$ is a vector of utilization thresholds for rising workloads to enable adding cores, and $rTh_i$=infinite. Specifically, $M_{k+1}-M_k$ additional cores are enabled, and k is then incremented. IOs are then processed on the $M_k$ cores. If utilization is not greater than the rising utilization threshold $rTh_k$, then it is determined whether utilization is less than a falling utilization threshold $fTh_k$, where $fTh_{-j}, \ldots,$ $fTh_0, \ldots, fTh_i$ is a vector of utilization thresholds for falling workloads to disable cores, and $fTh_{-j}=0$. If utilization is not less than the falling utilization threshold, then IOs continue to be processed on the $M_k$ cores. If utilization is less than the falling utilization threshold, then $M_k-M_{k-1}$ cores are quiesced and disabled. The value of k is then decremented and IOs are processed on the $M_k$ cores.

The algorithm described above can be implemented for a wide variety of definitions of utilization. Non-limiting examples include CPU utilization by work threads, average time to complete an IO, number of IOs currently being processed by all threads, current total IO rate, current IO rate per core, current total IOs in process, current total IOs in process per core, and average time to process IOs from arrival to completion, alone or in any combination.

Advantages of some implementations include reduced power consumption. For example, CPU power consumption may be reduced relative to keeping all cores active at all times. Disabling and enabling cores may provide an advantage over dynamically adjusting CPU clock speed to control power consumption because of better response time, i.e., the rate at which IOPS capability can be changed.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   in a data storage system comprising at least one compute node with a multi-core processor and non-volatile drives on which production storage objects containing host application data are stored, the production storage objects being accessed by instances of host applications running on host servers using input-output commands (IOs) to read data from the production storage objects and write data to the production storage objects, where IO latency is elapsed time between receipt of an IO by the storage system and return transmission of a write acknowledgment responsive to a write IO and return transmission of host application data responsive to a read IO, determining whether a current IO workload comprised of read IOs and write IOs can be serviced with fewer active processor cores than are currently enabled while maintaining a predetermined IO latency performance characteristic; and
   disabling at least one of the active processor cores responsive to determining that the current IO workload can be serviced with fewer active processor cores than are currently enabled while maintaining the predetermined IO latency performance characteristic.

2. The method of claim 1 further comprising determining whether the current IO workload cannot be serviced with the active processor cores that are currently enabled while maintaining the predetermined IO latency performance characteristic.

3. The method of claim 2 further comprising enabling at least one inactive processor core responsive to determining that the current IO workload cannot be serviced with the active processor cores that are currently enabled while maintaining the predetermined IO latency performance characteristic.

4. The method of claim 3 further comprising determining that the current IO workload can be serviced with fewer active processor cores than are currently enabled while maintaining the predetermined IO latency performance characteristic based on utilization being less than a falling utilization threshold.

5. The method of claim 4 further comprising determining that the current IO workload cannot be serviced with fewer active processor cores than are currently enabled while maintaining the predetermined IO latency performance characteristic based on utilization being greater than a rising utilization threshold.

6. The method of claim 5 further comprising determining utilization based on one or more of processor utilization by threads, average time to complete an IO, number of IOs currently being processed by all threads, current total IO rate, current IO rate per core, current total IOs in process, current total IOs in process per core, and average time to process IOs from arrival to completion, alone or in any combination.

7. The method of claim 6 further comprising:
disabling a plurality of the active processor cores responsive to determining that the current IO workload can be serviced with fewer active processor cores than are currently enabled while maintaining the predetermined IO latency performance characteristic; and
enabling a plurality of inactive processor cores responsive to determining that the current IO workload cannot be serviced with fewer active processor cores than are currently enabled while maintaining the predetermined IO latency performance characteristic.

8. A non-transitory computer-readable storage medium that stores instructions that when executed by a compute node of a data storage system perform a method comprising:
determining whether a current IO workload comprised of read input-output commands (IOs) and write IOs can be serviced with fewer active processor cores than are currently enabled while maintaining a predetermined IO latency performance characteristic where the data storage system comprises at least one compute node with a multi-core processor and non-volatile drives on which production storage objects containing host application data are stored, the production storage objects being accessed by instances of host applications running on host servers using IOs to read data from the production storage objects and write data to the production storage objects, where IO latency is elapsed time between receipt of an IO by the storage system and return transmission of a write acknowledgment responsive to a write IO and return transmission of host application data responsive to a read IO; and
disabling at least one of the active processor cores responsive to determining that the current IO workload can be serviced with fewer active processor cores than are currently enabled while maintaining the predetermined IO latency performance characteristic.

9. The non-transitory computer-readable storage medium of claim 8 in which the method further comprises determining whether the current IO workload cannot be serviced with the active processor cores that are currently enabled while maintaining the predetermined IO latency performance characteristic.

10. The non-transitory computer-readable storage medium of claim 9 in which the method further comprises enabling at least one inactive processor core responsive to determining that the current IO workload cannot be serviced with fewer active processor cores than are currently enabled while maintaining the predetermined IO latency performance characteristic.

11. The non-transitory computer-readable storage medium of claim 10 in which the method further comprises determining that the current IO workload can be serviced with fewer active processor cores than are currently enabled while maintaining the predetermined IO latency performance characteristic based on utilization being less than a falling utilization threshold.

12. The non-transitory computer-readable storage medium of claim 11 in which the method further comprises determining that the current IO workload cannot be serviced with fewer active processor cores than are currently enabled while maintaining the predetermined IO latency performance characteristic based on utilization being greater than a rising utilization threshold.

13. The non-transitory computer-readable storage medium of claim 12 in which the method further comprises determining utilization based on one or more of processor utilization by threads, average time to complete an IO, number of IOs currently being processed by all threads, current total IO rate, current IO rate per core, current total IOs in process, current total IOs in process per core, and average time to process IOs from arrival to completion, alone or in any combination.

14. The non-transitory computer-readable storage medium of claim 13 in which the method further comprises:
disabling a plurality of the active processor cores responsive to determining that the current IO workload can be serviced with fewer active processor cores than are currently enabled while maintaining the predetermined IO latency performance characteristic; and
enabling a plurality of inactive processor cores responsive to determining that the current IO workload cannot be serviced with fewer active processor cores than are currently enabled while maintaining the predetermined IO latency performance characteristic.

15. An apparatus comprising:
a plurality of non-volatile drives;
at least one compute node with a multi-core processor that runs threads that access the non-volatile drives on which production storage objects containing host application data are stored, the production storage objects being accessed by instances of host applications running on host servers using input-output commands (IOs) to read data from the production storage objects and write data to the production storage objects, where IO latency is elapsed time between receipt of an IO by the storage system and return transmission of a write acknowledgment responsive to a write IO and return transmission of host application data responsive to a read IO; and
a controller configured to determine whether a current IO workload comprised of read IOs and write IOs can be serviced with fewer active processor cores than are currently enabled while maintaining a predetermined IO latency performance characteristic and disable at least one of the active processor cores responsive to determining that the current IO workload can be serviced with fewer active processor cores than are currently enabled while maintaining the predetermined IO latency performance characteristic.

16. The apparatus of claim 15 further comprising the controller being configured to determine whether the current IO workload cannot be serviced with the active processor cores that are currently enabled while maintaining the predetermined IO latency performance characteristic.

17. The apparatus of claim 16 further comprising the controller being configured to enable at least one inactive processor core responsive to determining that the current IO workload cannot be serviced with the active processor cores that are currently enabled while maintaining the predetermined IO latency performance characteristic.

18. The apparatus of claim 17 further comprising the controller being configured to determine that the current IO workload can be serviced with fewer active processor cores than are currently enabled while maintaining the predetermined IO latency performance characteristic based on utilization being less than a falling utilization threshold.

19. The apparatus of claim 18 further comprising the controller being configured to determining that the current IO workload cannot be serviced with fewer active processor cores than are currently enabled while maintaining the predetermined IO latency performance characteristic based on utilization being greater than a rising utilization threshold.

20. The apparatus of claim 19 further comprising the controller being configured to determine utilization based on one or more of processor utilization by threads, average time to complete an IO, number of IOs currently being processed by all threads, current total IO rate, current IO rate per core, current total IOs in process, current total IOs in process per core, and average time to process IOs from arrival to completion, alone or in any combination.

* * * * *